United States Patent
Miyashita et al.

(10) Patent No.: US 9,212,628 B2
(45) Date of Patent: Dec. 15, 2015

(54) ABNORMALITY DETECTION DEVICE FOR EXHAUST GAS RECIRCULATION APPARATUS

(75) Inventors: Shigeki Miyashita, Susono (JP); Shinji Sadakane, Susono (JP); Masahiro Inoue, Susono (JP); Atsushi Fukuda, Susono (JP); Yutaka Hayakawa, Susono (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 899 days.

(21) Appl. No.: 13/505,163

(22) PCT Filed: Oct. 24, 2011

(86) PCT No.: PCT/JP2011/074443
§ 371 (c)(1),
(2), (4) Date: Apr. 30, 2012

(87) PCT Pub. No.: WO2012/057083
PCT Pub. Date: May 3, 2012

(65) Prior Publication Data
US 2012/0210987 A1    Aug. 23, 2012

(30) Foreign Application Priority Data

Oct. 25, 2010 (JP) ................................ 2010-238696

(51) Int. Cl.
*F02M 25/07* (2006.01)
*F02D 41/28* (2006.01)

(52) U.S. Cl.
CPC ....... *F02M 25/0702* (2013.01); *F02M 25/0707* (2013.01); *F02D 2041/288* (2013.01); *F02D 2200/0406* (2013.01); *Y02T 10/121* (2013.01)

(58) Field of Classification Search
CPC .................. F02D 2041/288; F02D 2200/0406; F02M 25/0702; F02M 25/0707; Y02T 10/121
USPC .................. 123/568.16, 568.11, 198 D, 382; 701/108, 114; 73/114.74
See application file for complete search history.

(56) References Cited

U.S. PATENT DOCUMENTS 3,582,812 A * 6/1971 Kochi .............................. 331/25
5,664,548 A * 9/1997 Izutani et al. ............. 123/568.16
(Continued)

FOREIGN PATENT DOCUMENTS

| EP | 0 935 060 A2 | 8/1999 |
| JP | 4 140464 | 5/1992 |

(Continued)

OTHER PUBLICATIONS

International Search Report Issued Jan. 17, 2012 in PCT/JP11/74443 Filed Oct. 24, 2011.

*Primary Examiner* — Erick Solis
*Assistant Examiner* — Carl Staubach
(74) *Attorney, Agent, or Firm* — Oblon, McClelland, Maier & Neustadt, L.L.P

(57) ABSTRACT

An abnormality detection device for an exhaust gas recirculation apparatus is provided that can perform abnormality detection with respect to an EGR valve while suppressing the influence of a size relationship between an intake pressure and an exhaust pressure. An ECU (Electronic Control Unit) executes processing for extracting a pulse from an intake pipe pressure value. The ECU executes arithmetic processing for performing Fast Fourier Transform (FFT) with respect to an output waveform of an intake pressure sensor obtained by sampling processing, and also executes extraction processing that extracts a "frequency component corresponding to a period of an exhaust pulse". The ECU executes processing that determines, in steps, whether or not the size of the extracted pulse (amplitude size) exceeds a threshold value. If the amplitude size exceeds the threshold value, the ECU executes processing that determines that a totally closed abnormality is occurring in the EGR valve.

10 Claims, 5 Drawing Sheets

(56) References Cited

U.S. PATENT DOCUMENTS

| | | | |
|---|---|---|---|
| 5,763,780 A * | 6/1998 | Matthews et al. | 73/504.13 |
| 7,899,608 B1 * | 3/2011 | Pederson et al. | 701/111 |
| 2003/0121316 A1 * | 7/2003 | Wakahara | 73/118.1 |
| 2005/0153674 A1 * | 7/2005 | Suganuma | 455/296 |
| 2006/0117750 A1 * | 6/2006 | Shahed et al. | 60/602 |
| 2008/0077304 A1 * | 3/2008 | Suzuki et al. | 701/102 |
| 2009/0199825 A1 * | 8/2009 | Piper et al. | 123/568.21 |
| 2011/0017179 A1 * | 1/2011 | Ichihara et al. | 123/568.21 |
| 2014/0318121 A1 * | 10/2014 | Keating et al. | 60/602 |

FOREIGN PATENT DOCUMENTS

| | | |
|---|---|---|
| JP | 8 284764 | 10/1996 |
| JP | 2002 227727 | 8/2002 |
| JP | 2003 193900 | 7/2003 |
| JP | 2010 127203 | 6/2010 |

* cited by examiner

ABNORMALITY DETECTION DEVICE FOR EXHAUST GAS RECIRCULATION APPARATUS

TECHNICAL FIELD

The present invention relates to an abnormality detection device for an exhaust gas recirculation apparatus.

BACKGROUND ART

Conventional technology relating to the present invention includes, for example, as described in Japanese Patent Laid-Open No. 2002-227727, an abnormality detection device for detecting an abnormality in an exhaust gas recirculation apparatus (hereunder, also referred to as "EGR (Exhaust Gas Recirculation) apparatus"). An abnormality detection device according to the aforementioned conventional technology has a function that estimates a value (size) of an intake pressure when the EGR apparatus operates normally. Unless an abnormality occurs in the EGR apparatus, since an appropriate amount of exhaust gas is recirculated to the intake passage, the estimated value and the actual intake pressure in the intake passage should be approximately the same. Therefore, the above described conventional abnormality detection device compares the estimated intake pressure and a detected intake pressure of an intake pressure sensor, and determines that there is an abnormality in the EGR apparatus when a deviation between the two values is greater than or equal to a predetermined value.

CITATION LIST

Patent Literature

Patent Literature 1: Japanese Patent Laid-Open No. 2002-227727
Patent Literature 2: Japanese Patent Laid-Open No. 2010-127203

SUMMARY OF INVENTION

Technical Problem

The above described conventional abnormality detection technology is based on the premise that unless an abnormality occurs in the EGR apparatus, an appropriate amount of exhaust gas should be recirculated to the intake passage. Based on this premise, a situation in which an increase in the intake pressure occurs when EGR gas has been recirculated to an intake passage through an EGR passage of an EGR apparatus is utilized for abnormality detection.

In this connection, as well as a pressure value, physical information in the form of pulses of intake air and exhaust gas is also included in intake air and exhaust gas in an internal combustion engine. In an internal combustion engine, particularly in an internal combustion engine with multiple cylinders, accompanying the sequential progression of the intake strokes of the respective cylinders, regular pulses of intake air are generated inside the intake passage. Further, as exhaust gas is sequentially discharged from each cylinder after combustion, regular pulses of exhaust gas are also generated inside the exhaust passage, and these pulses propagate into the EGR passage also. The pulse of intake air and pulse of exhaust gas are synthesized when the intake passage and the EGR passage communicate upon operation of the EGR apparatus. More specifically, a change arises in the form of the pulses in response to operation of the EGR apparatus. In view of the above circumstance, the inventors conducted extensive studies which focused on this point, and arrived at the novel concept of detecting an abnormality of an EGR apparatus by utilizing the form of such pulses.

The present invention has been conceived to solve the above described problem, and an object of the present invention is to provide an abnormality detection device for an exhaust gas recirculation apparatus that can perform abnormality detection for an exhaust gas recirculation apparatus by utilizing pulses of intake air and pulses of exhaust gas.

Solution To Problem

To achieve the above mentioned purpose, a first aspect of the present invention is an abnormality detection device for an exhaust gas recirculation apparatus that is an abnormality detection device that detects an abnormality in an exhaust gas recirculation apparatus that comprises, in an internal combustion engine having a plurality of cylinders: an EGR passage that, among a first exhaust passage communicating with some cylinders of the plurality of cylinders and a second exhaust passage communicating with other cylinders of the plurality of cylinders, links the first exhaust passage and an intake passage of the internal combustion engine; and an EGR valve mounted in the EGR passage;

the abnormality detection device comprising:

a pressure sensor provided at a position where the pressure sensor capable of detecting a synthesized pulse, an intake pulse of the intake passage and an exhaust pulse of the first exhaust passage being synthesized in the synthesized pulse;

extraction means that, based on a difference between a period of the intake pulse and a period of the exhaust pulse, extracts at least one pulse component among a pulse component of a period in accordance with the intake pulse and a pulse component of a period in accordance with the exhaust pulse from an output value of the pressure sensor that detects the synthesized pulse; and detection means that detects an abnormality in the exhaust gas recirculation apparatus based on a size of the at least one pulse component that is extracted by the extraction means.

A second aspect of the present invention is the abnormality detection device for an exhaust gas recirculation apparatus according to the first aspect, wherein the detection means comprises:

calculation means that calculates an integrated value obtained by integrating absolute values of slopes of tangent lines to a pulse waveform with respect to the at least one pulse component that is extracted by the extraction means, as the size of the pulse component; and means that detects an abnormality in the exhaust gas recirculation apparatus based on a result obtained by comparing the integrated value with a predetermined value.

A third aspect of the present invention is the abnormality detection device for an exhaust gas recirculation apparatus according to the first aspect or the second aspect, wherein the detection means comprises:

amplitude acquisition means that acquires an amplitude of the at least one pulse component that is extracted by the extraction means, as the size of the pulse component; and amplitude comparison detection means that detects an abnormality in the exhaust gas recirculation apparatus based on a result obtained by comparing the amplitude that is acquired by the amplitude acquisition means with a predetermined value.

A fourth aspect of the present invention is the abnormality detection device for an exhaust gas recirculation apparatus according to any one of the first to third aspects, wherein the detection means comprises:

closing abnormality detection means that, in a case where a control command is sent to the EGR valve to instruct the EGR valve to close, detects a totally closed abnormality that is an abnormality in which the EGR valve is not closed in accordance with the control command, based on a result obtained by comparing a size of the at least one pulse component that is extracted by the extraction means with the predetermined value.

A fifth aspect of the present invention is the abnormality detection device for an exhaust gas recirculation apparatus according to the fourth aspect, wherein:

the exhaust gas recirculation apparatus comprises an EGR valve opening degree sensor for detecting a degree of opening of the EGR valve; and the detection means comprises determination means that, in a case where the totally closed abnormality is detected by the closing abnormality detection means, determines that the totally closed abnormality is occurring at the EGR valve even when the degree of opening detected by the EGR valve opening degree sensor indicates that the EGR valve is closed.

A sixth aspect of the present invention is the abnormality detection device for an exhaust gas recirculation apparatus according to any one of the first to fifth aspects, wherein:

the pressure sensor comprises an intake pressure sensor that acquires intake pressure information that is information relating to an intake pressure of the internal combustion engine; and the extraction means comprises an exhaust pulse extraction means that, based on a difference between a period of the intake pulse and a period of the exhaust pulse, extracts a pulse component that is in accordance with the exhaust pulse from the output value of the pressure sensor that detects the synthesized pulse.

A seventh aspect of the present invention is the abnormality detection device for an exhaust gas recirculation apparatus according to any one of the first to sixth aspects, wherein:

the internal combustion engine comprises a supercharger, and control means that controls a supercharging pressure generated by the supercharger; and the abnormality detection device performs abnormality detection for the exhaust gas recirculation apparatus using the pressure sensor, the extraction means, and the detection means in a common manner for both a region in which an intake pressure>an exhaust pressure and a region in which an intake pressure≤an exhaust pressure with respect to the internal combustion engine.

An eighth aspect of the present invention is the abnormality detection device for an exhaust gas recirculation apparatus according to any one of the first to seventh aspects, wherein:

the internal combustion engine comprises a supercharger and a waste gate valve; and the extraction means comprises means that controls the waste gate valve so as to reduce a degree of opening of the waste gate valve or close the waste gate valve when detecting, with the pressure sensor, the synthesized pulse that is an object on which extraction of the pulse component is performed.

A ninth aspect of the present invention is the abnormality detection device for an exhaust gas recirculation apparatus according to any one of the first to eighth aspects, further comprising:

reduction means that reduces an intake volume of the internal combustion engine;

wherein the extraction means comprises means that controls the reduction means so as to reduce the intake volume when detecting, with the pressure sensor, the synthesized pulse that is an object on which extraction of the pulse component is performed.

Advantageous Effects of Invention

According to the first aspect, in a configuration in which a period of an intake pulse and a period of an exhaust pulse in a synthesized pulse are different to each other, by utilizing the difference between the periods, a predetermined pulse component can be extracted from the synthesized pulse that is detected with a pressure sensor. Since it can be considered that an abnormality does not exist in the exhaust gas recirculation apparatus if the size of the extracted pulse component is appropriate, abnormality detection for the exhaust gas recirculation apparatus can be performed based on the size of the pulse component.

According to the second aspect, by using a size of an integrated value of absolute values of slopes of tangent lines to a pulse waveform as a size of a pulse component, even in a case in which pulses of extremely different sizes are mixed, a decrease in the accuracy of abnormality detection can be suppressed.

According to the third aspect, the size of an extracted pulse can be determined based on the amplitude of the pulse.

According to the fourth aspect, when the presence of a pulse component that originally should not be present is recognized in a synthesized pulse that is detected by the pressure sensor, a determination can be made that a totally closed abnormality has occurred in an EGR valve of the exhaust gas recirculation apparatus.

According to the fifth aspect, a slight opening of the EGR valve that is difficult to determine with an EGR valve opening degree sensor can be detected as a totally closed abnormality.

According to the sixth aspect, an exhaust pulse component can be extracted from a synthesized pulse that is expressed as intake pressure information, and abnormality detection for the exhaust gas recirculation apparatus can be performed based on the size of the extracted exhaust pulse. Since an exhaust pressure is normally high compared to an intake pressure, an exhaust pulse can be extracted with favorable accuracy from intake pressure information that is detected utilizing an intake pressure sensor, and abnormality detection can be performed.

According to the seventh aspect, by utilizing the advantages of the abnormality detection principles according to the first to sixth aspects, abnormality detection for the exhaust gas recirculation apparatus can be performed using common detection means over a wide region that includes an operating region in which an intake pressure becomes higher than a back pressure that exists in a supercharged internal combustion engine.

According to the eighth aspect, a size of a synthesized pulse can be made relatively larger by reducing the degree of opening of a waste gate valve in a supercharged internal combustion engine, and extraction can be performed by extraction means with respect to a synthesized pulse that is obtained based on an output of a pressure sensor in that state.

According to the ninth aspect, a size of a synthesized pulse can be made relatively larger by reducing an intake volume, and extraction can be performed by extraction means with respect to a synthesized pulse that is obtained based on an output of a pressure sensor in that state.

DESCRIPTION OF EMBODIMENT

Embodiment

[Configuration of Embodiment]

Figure 1:
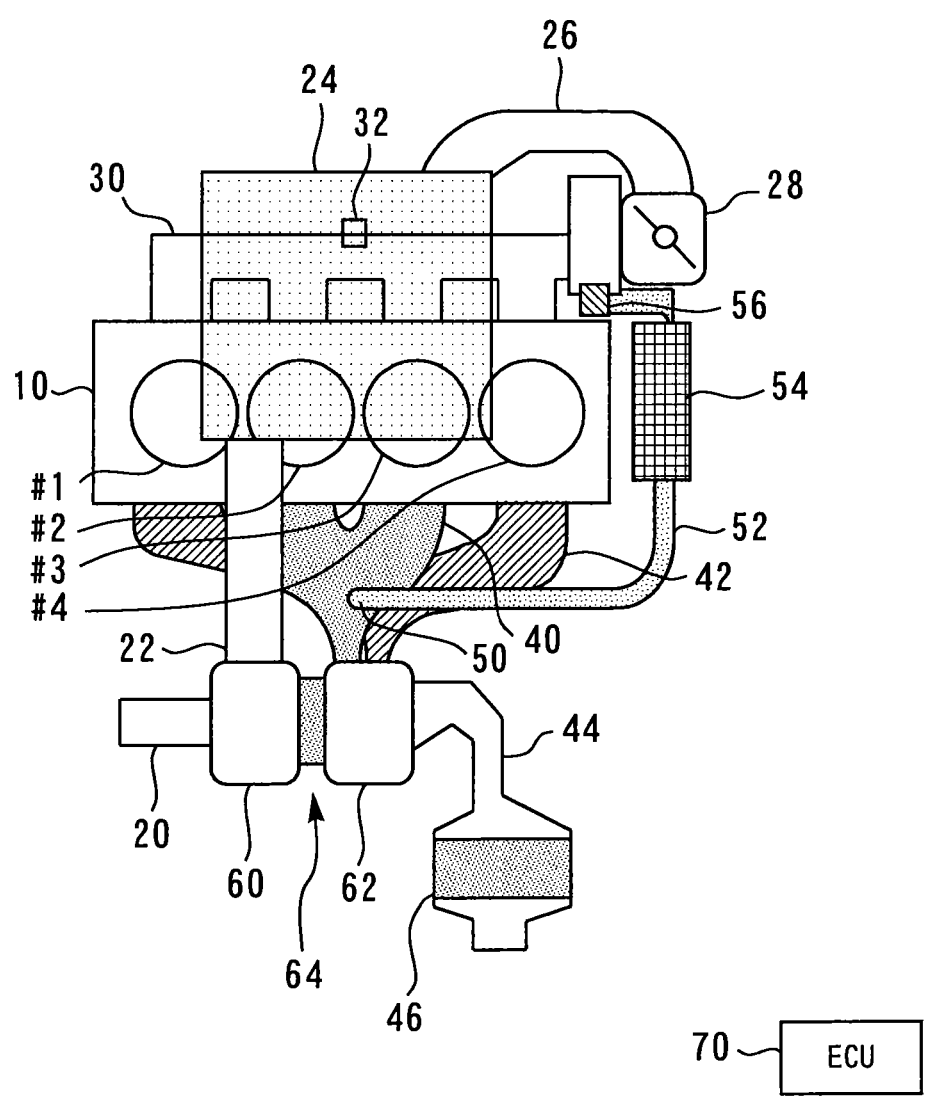
FIG. 1 is a view illustrating a configuration of an abnormality detection device for an exhaust gas recirculation apparatus according to an embodiment of the present invention, and also a configuration of an internal combustion engine to which the abnormality detection device is applied.

FIG. 1 is a view illustrating a configuration of an abnormality detection device for an exhaust gas recirculation apparatus according to an embodiment of the present invention, and also a configuration of an internal combustion engine to which the abnormality detection device is applied. In this connection, for brevity, hereunder the exhaust gas recirculation apparatus may also be referred to as an "EGR (Exhaust Gas Recirculation) apparatus". The present embodiment can be suitably used for detecting an abnormality in an EGR apparatus of an internal combustion engine that is mounted in a movable body such as a vehicle. In FIG. 1, an in-line four-cylinder type engine main body 10 (in other words, a cylinder block) including a #1 cylinder to a #4 cylinder is shown.

The intake port of each cylinder communicates with an intake manifold 30 through interposed intake valves (not illustrated in FIG. 1), respectively. The intake manifold 30 communicates with an intake passage including, in a direction towards the upstream side thereof, intake passage sections 20, 22, 24, and 26. A compressor 60 that is included in a turbocharger 64 is interposed between the intake passage section 20 and the intake passage section 22. An electronically controlled throttle 28 is interposed between the intake passage section 26 and the intake manifold 30.

As shown in FIG. 1, the engine main body 10 includes an intake pressure sensor 32 for detecting an intake pressure. According to the present embodiment, the intake pressure sensor 32 is installed at a center section of the intake manifold 30 (that is, at a branch point between a portion that branches to the #2 cylinder and a portion that branches to the #3 cylinder).

The respective exhaust ports of the #2 cylinder and the #3 cylinder communicate with a first exhaust manifold 40 through interposed exhaust valves (not shown), respectively. On the other hand, the respective exhaust ports of the #1 cylinder and the #4 cylinder communicate with a second exhaust manifold 42 through interposed exhaust valves (not shown), respectively.

According to the present embodiment, it is assumed that combustion in the engine main body 10 is performed in the order of #1 cylinder→#3 cylinder→#4 cylinder→#2 cylinder. According to this combustion order, exhaust gas of the #1 cylinder is discharged to the second exhaust manifold 42, and thereafter exhaust gas of the #3 cylinder is discharged to the first exhaust manifold 40. Next, exhaust gas of the #4 cylinder is discharged to the second exhaust manifold 42, and thereafter exhaust gas of the #2 cylinder is discharged to the first exhaust manifold 40. As a result, the number of pulses of exhaust gas in the first exhaust manifold 40 is exactly half the number of pulses of intake air on the intake passage side.

The engine main body 10 according to the present embodiment is a supercharged internal combustion engine, and more specifically is a supercharged internal combustion engine with a twin-entry turbo mechanism as a supercharger. The first exhaust manifold 40 and the second exhaust manifold 42 both communicate with a turbine 62. The turbine 62 is connected to an exhaust pipe 44. A catalyst 46 is provided in the exhaust pipe 44.

The internal combustion engine according to the present embodiment includes an EGR apparatus for performing exhaust gas recirculation (EGR). As shown in FIG. 1, the EGR apparatus includes an EGR pipe 52, an EGR cooler 54, and an EGR valve 56. One end of the EGR pipe 52 is connected to the first exhaust manifold 40 at an EGR gas take-out portion 50 that is located before the turbine 62. The other end of the EGR pipe 52 is connected to the intake manifold 30 through the EGR valve 56.

The EGR apparatus according to the present embodiment has a configuration referred to as "one-side EGR take out" and a configuration referred to as "pre-turbo take out". The term "one-side EGR take out" refers to a configuration in which EGR gas is taken out from only one of two exhaust passages, namely, the first exhaust manifold 40 and the second exhaust manifold 42. The term "pre-turbo take out" refers to a configuration in which the EGR pipe 52 is connected to an exhaust passage at a position that is before the turbine 62.

The internal combustion engine shown in FIG. 1 includes a sensor system including a crank angle sensor, an airflow sensor, and an exhaust gas sensor such as an air-fuel ratio sensor (none of the sensors are shown), and an ECU (Electronic Control Unit) 70 that controls the operating state of the engine main body 10. First, the sensor system will be described. The crank angle sensor outputs a signal that is synchronous with rotation of a crankshaft. The airflow sensor detects an intake air amount. The air-fuel ratio sensor is an exhaust gas sensor that detects an exhaust air-fuel ratio on the upstream side of the catalyst 46.

The sensor system also includes various sensors that are required for control of the engine main body 10 and the vehicle in which the engine main body 10 is mounted (for example, a water temperature sensor that detects the temperature of engine cooling water, and an accelerator opening degree sensor that detects the degree of opening of an accelerator). These sensors are connected to the input side of the ECU 70. Various actuators including the throttle 28 and a fuel injection valve are connected to the output side of the ECU 70.

The ECU 70 executes operation control by driving each actuator while detecting operating information of the internal combustion engine by means of the sensor system. More specifically, the ECU 70 detects the number of engine revolutions and the crank angle based on the output of the crank angle sensor, and calculates an intake air amount based on the output of the airflow sensor. The ECU 70 also calculates the engine load based on the intake air amount and the number of engine revolutions and the like, and determines the fuel injection timing and the like based on the crank angle. The ECU 70 calculates a fuel injection amount based on the intake air amount and the load and the like. When the fuel injection timing is reached, the ECU 70 drives the fuel injection valve and drives a spark plug. Thus, an air-fuel mixture inside the cylinders can be burned to operate the engine.

The ECU 70 can execute processing (sampling processing) that successively acquires output values of the intake pressure sensor 32 in accordance with the crank angle (or time). Thus, output values of the intake pressure sensor 32 can be acquired as a continuous waveform in accordance with the crank angle. According to the present embodiment, a waveform obtained based on the output of the intake pressure sensor 32 is treated as a waveform that shows a pulse that arise inside the intake manifold 30. Preferably, the sampling processing to be executed by the ECU 70 has a sampling period or resolution of a degree that can precisely detect a waveform of an intake pulse in a form that accurately reflects the period (frequency) of the relevant pulse.

The ECU 70 can execute processing for subjecting a pulse wave that is obtained based on the output of the intake pressure sensor 32 to Fourier transformation. More specifically, according to the present embodiment, the ECU 70 stores arithmetic processing procedures based on a Fast Fourier Transform (FFT) algorithm. Thus, the ECU 70 can extract a pulse component of a desired frequency from a pulse that is obtained based on the output of the intake pressure sensor 32.

[Abnormality Detection Operations According To Embodiment]

Figure 2:
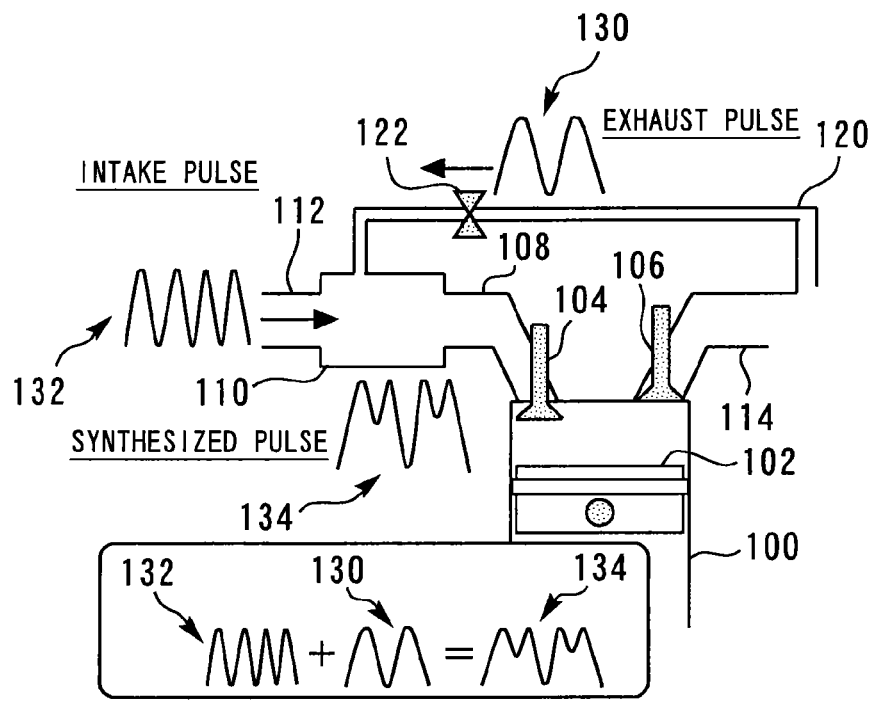
FIG. 2 is a schematic diagram for explaining a detection principle of the abnormality detection device for an EGR apparatus according to the present embodiment.
Figure 3:
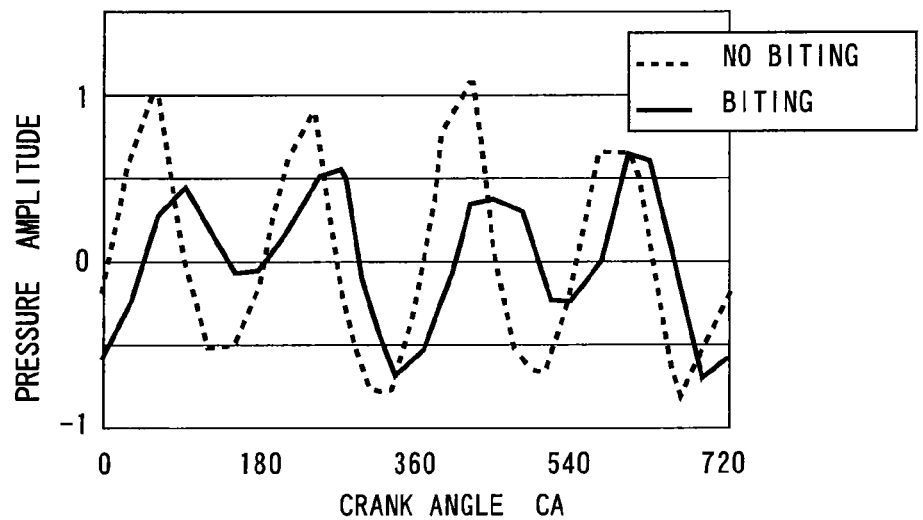
FIG. 3 is a view that illustrates an intake pipe pressure characteristic that the inventors studied in relation to the embodiment of the present invention.

Hereunder, abnormality detection operations of the abnormality detection device for an EGR apparatus according to the present embodiment are described using FIG. 2 and FIG. 3. In the following description, a pulse that is originally a pulse of an intake pressure may also be referred to simply as "intake pulse", and a pulse that is originally a pulse of an exhaust pressure may also be referred to simply as "exhaust pulse". A pulse that arises as the result of an intake pulse and an exhaust pulse being synthesized may also be referred to as "synthesized pulse".

FIG. 2 is a schematic diagram for explaining a detection principle of the abnormality detection device for an EGR apparatus according to the present embodiment. For the following description, it is assumed that, similarly to the internal combustion engine of the embodiment that has been discussed above referring to FIG. 1, the hardware configuration shown in FIG. 2 is fundamentally an internal combustion engine including a plurality of cylinders, and has the "one-side EGR take out" and "pre-turbo take out" configurations.

A cylinder 100 including a piston 102, an intake valve 104 that opens and closes an intake port 108, an exhaust valve 106 that opens and closes an exhaust port 114, an EGR pipe 120 that connects a downstream position of the exhaust port 114 and a surge tank 110, and an EGR valve 122 that is provided in the EGR pipe 120 are illustrated in FIG. 2. In the configuration shown in FIG. 2 also, similarly to the hardware configuration of the present embodiment shown in FIG. 1, the EGR pipe 120 is connected to only one of the two exhaust passages.

As shown in FIG. 2, accompanying the intake of air in the arrow direction, an intake pulse 132 arises in the surge tank 110 through the intake passage 112. On the other hand, exhaust gas inside the EGR pipe 120 proceeds in the arrow direction shown in FIG. 2, and as a result an exhaust pulse 130 propagates through the EGR pipe 120.

In the case of a configuration that takes EGR gas out from only one exhaust passage among multiple independent exhaust passages, the number of pulses accompanying air intake and the number of pulses inside the exhaust passage to which the EGR pipe is connected are different. Accordingly, the period of an intake pulse and the period of an exhaust pulse in the EGR pipe will be different. If the configuration is such that the number of exhaust pulses in the exhaust passage which takes out the EGR gas is exactly half of the number of intake pulses on the intake passage side, in the relationship between the number of engine revolutions and the pulses, the intake pulse 132 will be a secondary rotational pulse and the exhaust pulse 130 will be a primary rotational pulse.

In a state in which the EGR valve 122 is open, the plurality of pulses whose periods (frequencies) are different to each other are synthesized at the surge tank 110 at which the EGR pipe 120 and the intake passage 112 merge. Thereupon, as shown schematically in FIG. 2, a synthesized pulse 134 arises in which the intake pulse 132 and the exhaust pulse 130 are synthesized. In a state in which the EGR valve 122 is open (in other words, in a state in which the EGR valve 122 is not totally closed), a pressure sensor (according to the present embodiment, the intake pressure sensor 32 shown in FIG. 1; an illustration thereof is omitted from FIG. 2) in the intake system detects a pressure change that is caused by the synthesized pulse 134.

Since the periods of the intake pulse 132 and the exhaust pulse 130 are different, a component of each pulse can be extracted from the synthesized pulse 134 by performing filtering for the respective periods of the intake pulse 132 and the exhaust pulse 130 with respect to the synthesized pulse 134 (or alternatively, by extracting a pulse component of a specific frequency after carrying out frequency domain representation with respect to the synthesized pulse by Fourier transform or the like). That is, by executing arithmetic processing such as FFT or filtering with respect to an output signal of the intake pressure sensor 32, a specific pulse component can be extracted from a synthesized pulse that the intake pressure sensor 32 detects.

The size of the intake pulse 132 and the exhaust pulse 130 in the synthesized pulse 134 changes in accordance with an operating state (degree of opening) of the EGR valve 122, and there is thus a correlation between the size of a pulse and the operating state of the EGR valve 122. Accordingly, if the size of one or both of the intake pulse 132 and the exhaust pulse 130 is determined, and it is found as a result that the size differs significantly from a time that the EGR apparatus is normal (time of normal operation of the EGR valve), it can be considered that the EGR apparatus is in an abnormal state (the EGR valve 122 is not operating normally). That is, by comparing the size of an extracted pulse with a predetermined value or the like, it is possible to determine whether an extracted pulse component matches a characteristic that should be exhibited when the EGR apparatus is operating normally.

More specifically, for example, when the existence of a pulse component that originally should not be propagated to the position of the pressure sensor (for example, in FIG. 2, when the EGR valve 122 is closed, the exhaust pulse 130 should not be propagated to the inside of the surge tank 110) is recognized in the pressure sensor output, it can be determined that the propagation path of the pulse component is not blocked.

As described above, according to the abnormality detection principle of the present embodiment, detection of an abnormality in an EGR apparatus can be performed utilizing an intake pulse and an exhaust pulse.

In this connection, by utilizing a difference between the periods of respective pulses, even if size relationships between intake pressures and exhaust pressures are different (for example, a case in which a difference between an intake pressure and an exhaust pressure is small, a case in which an intake pressure is higher than an exhaust pressure, or the reverse thereof and the like), a specific pulse can be selectively extracted. According to the above described detection principle, detection of an abnormality in an EGR apparatus can be performed while suppressing the influence of a size relationship between an intake pressure and an exhaust pressure.

[Analytical Results For Embodiment]

FIG. 3 is a view that illustrates an intake pipe pressure characteristic that the inventors studied in relation to the embodiment of the present invention. The characteristic illustrated in FIG. 3 is an intake pipe pressure characteristic under "a condition in which, in a supercharged internal combustion engine, a supercharging pressure (intake pipe pressure) is greater than a back pressure (exhaust pipe pressure), and fresh air flows into an exhaust passage through an EGR pipe when an EGR valve is open". Under this condition, the inventors studied an intake pipe pressure characteristic in accordance with the existence or non-existence of "biting". Here, the term "biting" refers to a state in which foreign matter has become sandwiched in the EGR valve and total closing of the EGR valve is obstructed.

In FIG. 3, a solid line shows a characteristic in a case where "there is biting", and a dashed line shows a characteristic in a case where "there is no biting". The dashed line that shows the characteristic when "there is no biting" exhibits a pressure characteristic of only an intake pulse, because the EGR valve is closed.

In contrast, the solid line that shows the characteristic when "there is biting" exhibits a pressure characteristic that resembles the synthesized pulse 134 that is schematically illustrated in FIG. 2, and is different to the characteristic exhibited by the dashed line. This is because the exhaust pulse that is the primary rotational wave is propagated to the intake system through an open portion of the EGR valve that arises due to biting, and is thereafter synthesized with the intake pulse.

[Specific Processing of Embodiment]

Figure 4:
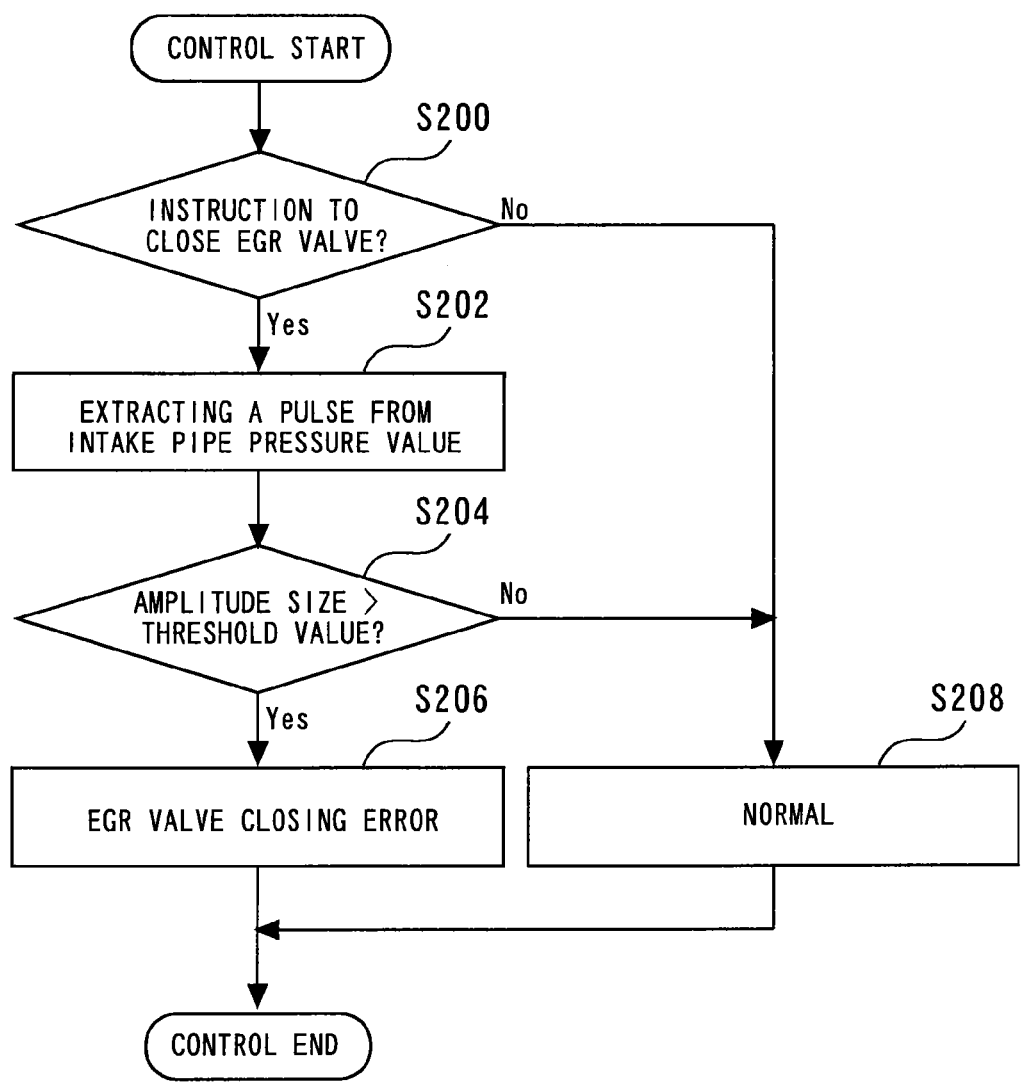
FIG. 4 is a flowchart of a routine that an ECU executes according to the present embodiment.

Hereunder, specific processing performed by the abnormality detection device for an EGR apparatus according to the embodiment of the present invention is described using FIG. 4. FIG. 4 is a flowchart of a routine that the ECU 70 executes according to the present embodiment. According to the routine shown in FIG. 4, a totally closed abnormality of the EGR valve 56 can be detected. The term "totally closed abnormality" refers to an abnormality in which the EGR valve 56 is actually not totally closed in a situation in which the EGR valve 56 should be closed, that is caused by various factors such as, for example, biting.

According to the routine shown in FIG. 4, first, the ECU 70 executes processing that determines whether or not a command value that is sent to the EGR valve 56 is an instruction to close the valve (step S200). In this step, for example, the ECU 70 determines whether or not a control status with respect to the EGR valve 56 inside the ECU 70 is a totally closed state, or whether or not a control signal that the ECU 70 sends to the EGR valve 56 or last sent to the EGR valve 56 is a control signal for closing the EGR valve 56. If the ECU 70 determines that the condition of step S200 is not established, since an environment for performing abnormality detection has not been established, the ECU 70 determines in step S208 that the EGR valve 56 is normal and thereafter ends the current routine.

In contrast, if the ECU 70 determines that the condition of step S200 is established, the ECU 70 executes processing for extracting a pulse from an intake pipe pressure value (step S202). As a precondition for this step, the ECU 70 executes sampling processing with respect to the output value of the intake pressure sensor 32. In the present step, the ECU 70 performs FFT arithmetic processing with respect to an output waveform of the intake pressure sensor 32 obtained by the sampling processing, and also executes extraction processing that extracts a "frequency component corresponding to a period of an exhaust pulse". In the present embodiment, a "frequency corresponding to a period of an exhaust pulse" that is the object of extraction is a frequency of a primary wave of the number of engine revolutions of the engine main body 10.

In this connection, the higher that the number of engine revolutions is, the shorter that the period of an exhaust pulse inside the first exhaust manifold 40 (and, by extension, an exhaust pulse inside the EGR pipe 52) will be, and the frequency of the exhaust pulse wave will increase in accordance therewith. To counteract this, according to the present embodiment it is assumed that the extraction processing in step S202 includes processing that increases the extraction object frequency in response to an increase in the number of engine revolutions.

Next, the ECU 70 executes processing that determines whether or not the size of the extracted pulse obtained in step 202 exceeds a threshold value (step S204). In this step, according to the present embodiment, first the ECU 70 executes processing that calculates an amplitude based on the pulse component. Subsequently, the ECU 70 executes processing to compare the size of the calculated amplitude with a predetermined threshold value, and determine whether or not the relationship "amplitude size>threshold value" holds.

It is sufficient to previously determine the threshold value by experimentation or the like. According to the present embodiment, when using the hardware configuration shown in FIG. 1, a frequency component of an exhaust pulse in an intake pulse when the EGR valve 56 is totally closed is investigated in advance in accordance with the number of engine revolutions, and a threshold value with respect to an amplitude value thereof is stored in advance in the ECU 70 in the form of a map or mathematical expression.

If the size of the amplitude exceeds the threshold value, the ECU 70 executes processing that determines that a totally closed abnormality has occurred in the EGR valve (step S206). In contrast, if the size of the amplitude is less than or equal to the threshold value, the ECU 70 shifts to step S208 to execute processing that determines that the EGR valve 56 is operating normally. Thereafter, the ECU 70 ends the current routine.

According to the above described processing, in a configuration in which a period of an intake pulse and a period of an exhaust pulse in a synthesized pulse are different to each other, by utilizing the difference between the periods, an exhaust pulse component can be extracted from a synthesized pulse that is detected by the intake pressure sensor 32. By using the size of the amplitude of the extracted pulse for abnormality detection, abnormality detection for an EGR apparatus can be performed (more specifically, according to the present embodiment, detection of an operational abnormality or totally closed abnormality of the EGR valve 56). Further, the influence of a decrease in detection accuracy that is due to a size relationship between an intake pressure and an exhaust pressure can be suppressed.

In addition, when the existence of a pulse component that originally does not appear in a synthesized pulse is recognized in a synthesized pulse detected by the intake pressure sensor 32, it can be determined that a totally closed abnormality has occurred at the EGR valve 56.

Further, according to the present embodiment, a pulse component that is in accordance with an exhaust pulse can be extracted from a sensor output value obtained by detecting a synthesized pulse using the intake pressure sensor 32 as a pressure sensor. It is thus possible to extract an exhaust pulse component from a synthesized pulse that is expressed as intake pressure information, and perform abnormality detection for the EGR apparatus based on the size of the extracted exhaust pulse. Since an exhaust pressure is normally sufficiently high compared to an intake pressure, an exhaust pulse can be extracted with favorable accuracy from intake pressure information that is detected utilizing an intake pressure sensor, and abnormality detection can be performed. Furthermore, since an intake pressure sensor is generally mounted in an internal combustion engine to measure an intake pressure, utilizing the intake pressure sensor eliminates the need to add a new dedicated sensor.

In this connection, according to the above described embodiment, a technical effect described hereunder can also be exerted as an advantageous effect with respect to the conventional technology.

In a natural aspiration-type internal combustion engine, the intake pressure is sufficiently low compared to the back pressure (exhaust pressure) while the engine is operating. Consequently, in a natural aspiration-type internal combustion engine, if an abnormality arises in an EGR apparatus (more specifically, an abnormality in which an EGR valve that should be closed is open or the like), it is considered that abnormality detection can also be performed by a technique that is based on a change in the size of the intake pressure. More specifically, for example, in the abnormality detection device disclosed in Japanese Patent Laid-Open No. 2002-227727, it is considered that a deviation between an estimated value and a detected value at the time of an abnormality is of a sufficiently large degree to allow the two values to be easily distinguished from each other. Therefore, it has been possible to use an abnormality detection technique that is based on the size of an intake pressure value, such as disclosed in Japanese Patent Laid-Open No. 2002-227727, in a conventional natural aspiration-type internal combustion engine. Further, even if a totally closed abnormality caused by biting or the like occurs in a natural aspiration-type internal combustion engine, the totally closed abnormality does not constitute a major problem other than in a low-load region such as when the engine is idling.

On the other hand, recently research and development has been proceeding with respect to internal combustion engines that include both a supercharger and an EGR apparatus (hereunder, also referred to as "supercharged EGR internal combustion engine"). In a supercharged EGR internal combustion engine, there is also a need to accurately perform abnormality detection for an EGR apparatus when a relationship in which the supercharging pressure>the back pressure holds. This is because, for example, if a totally closed abnormality occurs at an EGR valve when the relationship in which the supercharging pressure>the back pressure holds, fresh air flows into the exhaust system, and there is a risk that this will lead to an over-temperature (OT) condition at the exhaust catalyst.

In an operating region in which an intake pressure of a supercharged internal combustion engine becomes higher than a back pressure, it is difficult to perform abnormality detection that depends solely on the size of an intake pressure in accordance with operation of an EGR apparatus. More specifically, according to the abnormality detection technique disclosed in Japanese Patent Laid-Open No. 2002-227727, a deviation between the above described estimated value and detected value at the time of an abnormality occurrence decreases and it is difficult to perform abnormality detection for an EGR apparatus with high accuracy. Since a region in which the supercharging pressure>the back pressure is a region that originally cannot arise in a natural aspiration-type internal combustion engine, it is difficult to solve the above described problem that is unique to a supercharged EGR internal combustion engine by using the conventional technology that is based on the premise that the technology will be applied to a natural aspiration-type internal combustion engine.

In this respect, according to the present embodiment, as described above, an apparatus is provided that can accurately detect an abnormality in the operation of an EGR valve even when a relationship in which a supercharging pressure>a back pressure holds with respect to a configuration in which an EGR apparatus is mounted in a supercharged internal combustion engine.

Moreover, the abnormality detection technique according to the present embodiment can perform abnormality detection also in a region in which the relationship in which a supercharging pressure>a back pressure does not hold. Consequently, abnormality detection for an EGR apparatus can be performed using common detection processing over a wide region (including an idling region also) that includes a region in which an intake pipe pressure>a back pressure and a region in which an intake pipe pressure≤a back pressure.

Note that, in the above described embodiment, the first exhaust manifold 40 corresponds to "first exhaust passage" according to the above described first aspect, the second exhaust manifold 42 corresponds to "second exhaust passage" according to the first aspect, the EGR pipe 52 corresponds to "EGR passage" according to the first aspect, the EGR valve 56 corresponds to "EGR valve" according to the first aspect, and the intake pressure sensor 32 corresponds to "pressure sensor" according to the first aspect. Further, the "one-side EGR take out" configuration of the above described embodiment corresponds to a configuration that "among a first exhaust passage and a second exhaust passage, links the first exhaust passage and an intake passage of the internal combustion engine".

Further, in the above described embodiment, "extraction means" according to the above described first aspect is implemented by the ECU 70 executing the processing of step S202 in the routine shown in FIG. 4, and "detection means" according to the first aspect is implemented by the ECU 70 executing the processing of steps S204 and S206 in the routine shown in FIG. 4. Further, in the above described embodiment, the size of an amplitude of a pulse with respect to an exhaust pulse component that is extracted in step S202 corresponds to a "size of a pulse component" according to the above described first aspect, and a threshold value used for comparison in step S204 corresponds to a "predetermined value" according to the above described third invention.

MODIFICATION EXAMPLES OF EMBODIMENT

Modification Example 1

Figure 5:
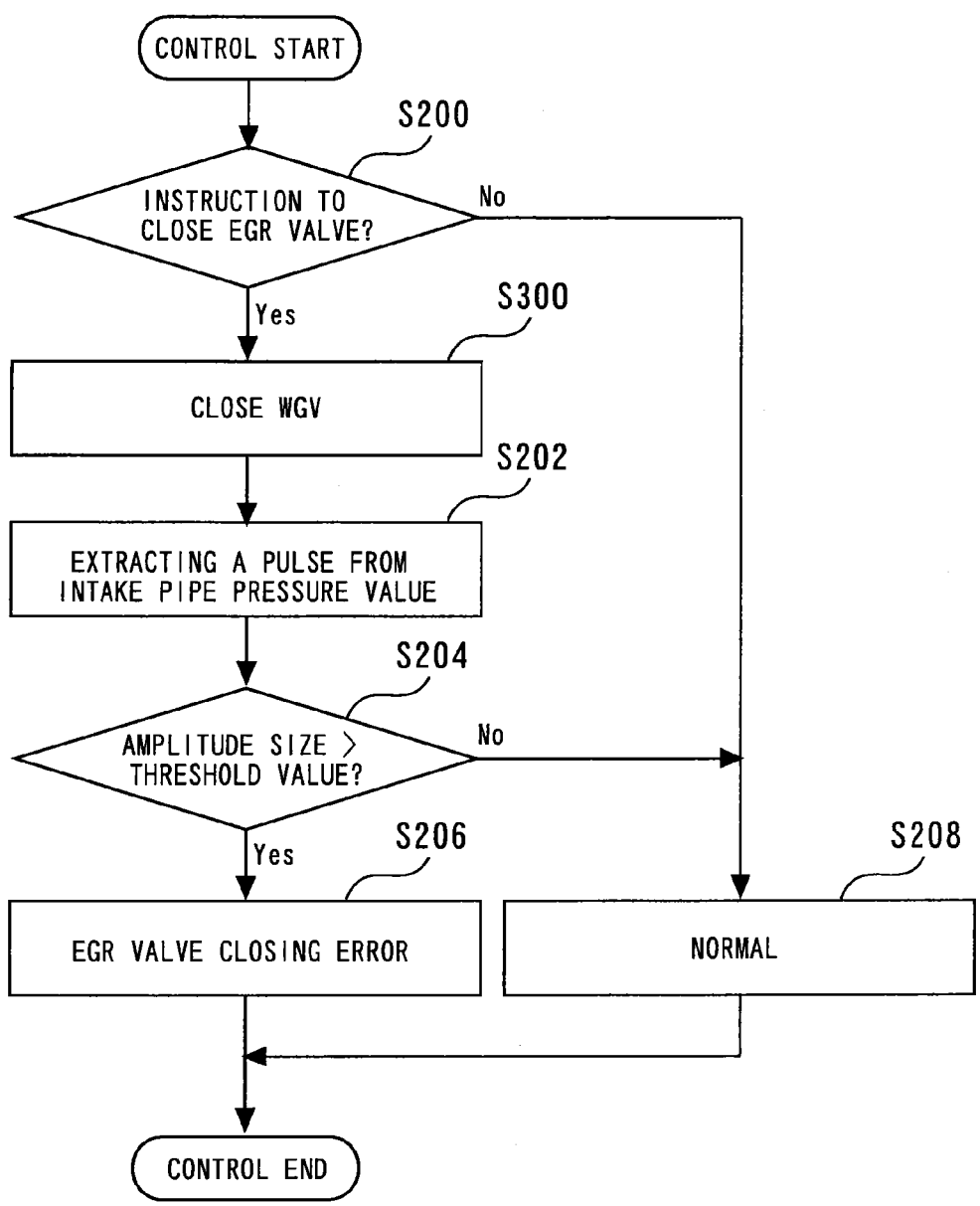
FIG. 5 is a view that illustrates a modification example of the abnormality detection device for an EGR apparatus according to the embodiment of the present invention.

FIG. 5 is a view that illustrates a modification example of the abnormality detection device for an EGR apparatus according to the embodiment of the present invention, and shows a flowchart of a routine that the ECU 70 executes according to the present modification example. The routine shown in FIG. 5 executes the same processing as the routine shown in FIG. 4, except that step S300 is also executed by the present routine. According to the present modification example, it is assumed that a waste gate valve (WGV) is added to the hardware configuration shown in FIG. 1.

In the routine shown in FIG. 5, after the condition in step S200 is established and before the extraction processing in step S204, the ECU 70 executes processing that closes the WGV (step S300). By closing the WGV, the size of a synthesized pulse can be made relatively larger. The extraction processing in step S202 extracts an exhaust pulse component from a sensor output value for a synthesized pulse that has been made relatively larger in this manner. Thus, the accuracy of abnormality detection based on a synthesized pulse obtained from the output of the intake pressure sensor 32 can be improved.

Modification Example 2

Figure 6:
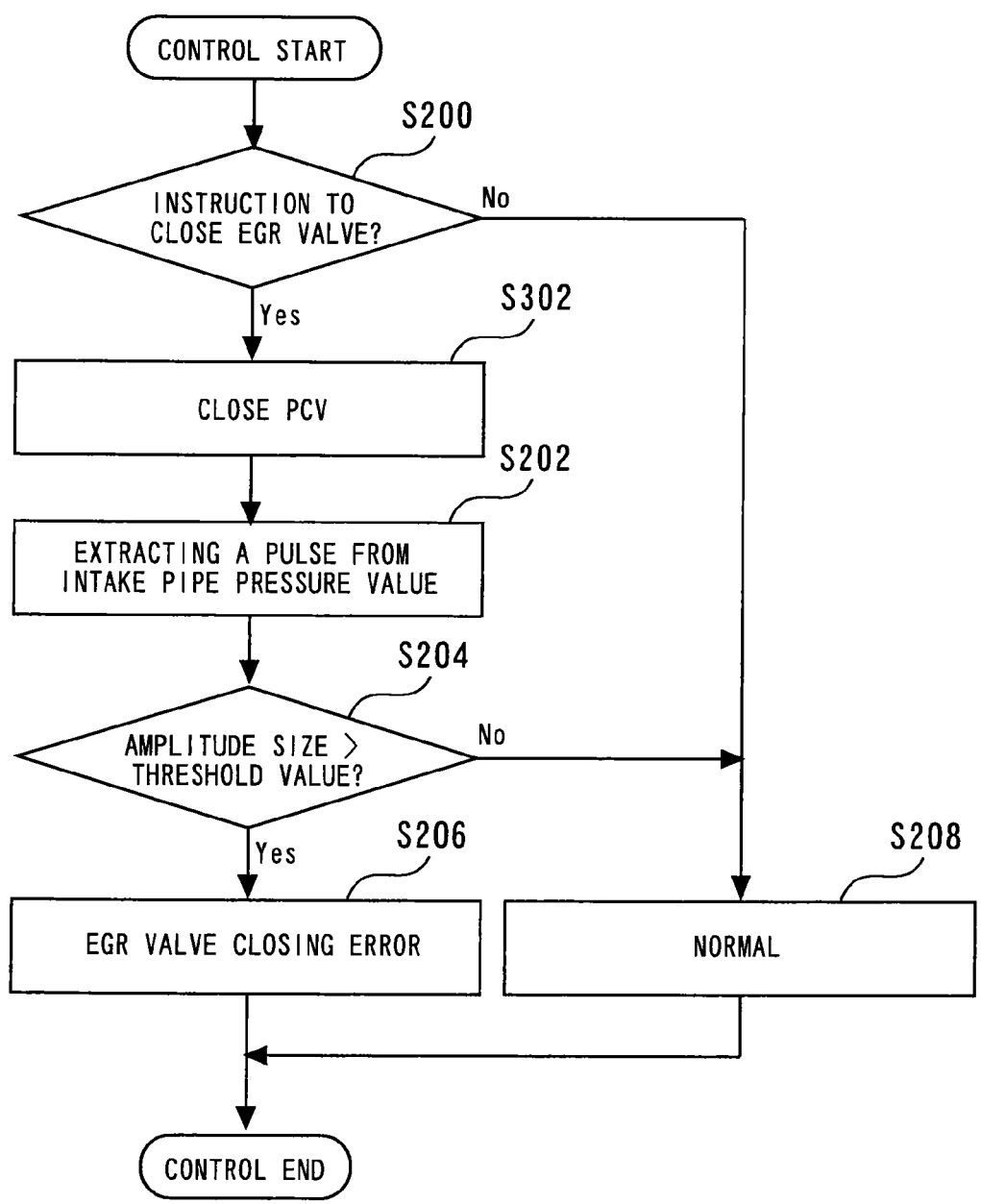
FIG. 6 is a view that illustrates a modification example of the abnormality detection device for an EGR apparatus according to the embodiment of the present invention.

FIG. 6 is a view that illustrates a modification example of the abnormality detection device for an EGR apparatus according to the embodiment of the present invention, and shows a flowchart of a routine that the ECU 70 executes according to the present modification example. The routine shown in FIG. 6 executes the same processing as the routine shown in FIG. 4, except that step S302 is also executed by the present routine. According to the present modification example, it is assumed that a PCV (positive crankcase ventilation valve) is added to the hardware configuration shown in FIG. 1.

In the routine shown in FIG. 6, after the condition in step S200 is established and before the extraction processing in step S204, the ECU 70 executes processing that closes the PVC (step S300). By closing the PVC, the intake volume can be reduced and the size of a synthesized pulse can be made relatively larger. The extraction processing in step S202 extracts an exhaust pulse component from a sensor output value for a synthesized pulse that has been made relatively larger in this manner. Thus, the accuracy of abnormality detection based on a synthesized pulse obtained from the output of the intake pressure sensor 32 can be improved.

Modification Example 3

According to the above described embodiment, the abnormality detection device for an EGR apparatus according to the present invention is applied to a supercharged internal combustion engine that is equipped with a twin-entry turbo. However, the present invention is not limited thereto, and the present invention can also be applied to an internal combustion engine that is not equipped with a supercharger (that is, a natural aspiration-type internal combustion engine). More specifically, the present invention can be applied to an internal combustion engine that has a plurality of cylinders and has a plurality of independent exhaust passages (for example, a structure that takes EGR gas out from only a bank that is provided on one side of a V-type engine), irrespective of whether or not the internal combustion engine is equipped with a supercharger. This is because, according to this configuration also, a period of an intake pulse and a period of an exhaust pulse differ in the same way as in the internal combustion engine of the above described embodiment, and therefore an exhaust pulse component can be extracted based on the differences between the periods.

In this connection, with respect to the following configuration (1) and configuration (2) also, a "one-side EGR take out" state is entered when actually taking out EGR gas.

Configuration (1): A configuration which although having a plurality of independent exhaust passages that are connected to separate cylinders, and in which an EGR passage connects to each of the plurality of exhaust passages, by switching an exhaust passage that connects with the EGR passage, selectively takes EGR gas out from specific exhaust passages of a number less than the total number of the plurality of exhaust passages.

Configuration (2): A configuration which although having a plurality of independent exhaust passages that are connected to separate cylinders, and in which an EGR passage connects to each of the plurality of exhaust passages, does not constantly take EGR gas out from all of the plurality of exhaust passages, but rather takes EGR gas out from only some exhaust passages under a certain condition in accordance with an operating condition or the like.

In the above configurations also, when a "one-side EGR take out" connection relationship is established when EGR gas is actually being taken out, a difference arises between a period of an intake pulse and a period of an exhaust pulse. Accordingly, the aforementioned configurations (1) and (2) can also apply the present invention that utilizes a difference between a period of an intake pulse and a period of an exhaust pulse as a detection principle, and are included in an "exhaust gas recirculation apparatus" according to the above described first aspect of the present invention.

Modification Example 4

In the above described embodiment, abnormality detection for an EGR apparatus is performed based on the size of an amplitude of an extracted exhaust pulse component. However, the present invention is not limited thereto. As a "size of a pulse component" according to the present invention, it is also possible to appropriately use a value that can quantitatively show the degree to which a pulse of a specific period is included in a synthesized pulse that is other than the size of an amplitude.

For example, when comparing a plurality of pulses having the same period, normally a pulse for which a "size of a slope of a tangent line to the pulse waveform" (sharpness of the rising edge) is greatest will also have the largest amplitude value. Therefore, a configuration may be adopted in which a "size of a slope of a tangent line to the pulse waveform" is calculated for an extracted pulse component, and the higher that the absolute value of that value is, the larger that the extracted pulse component is determined to be.

Further, for example, an "integrated value of absolute values of slopes of tangent lines to a pulse waveform of a pulse component" can be used as a value that represents the size of a pulse component. Abnormality detection for an EGR apparatus may then be performed based on a result obtained by comparing the integrated value and a predetermined value. By using this integrated value, a decrease in the abnormality detection accuracy can be suppressed even in a case in which pulses of extremely different sizes are mixed.

Modification Example 5

An EGR valve normally includes an EGR valve opening degree sensor for detecting a degree of opening of the EGR valve. When the EGR valve opening degree sensor indicates that the EGR valve 56 is closed (zero degree of opening), unless there are special circumstances such as those in which an abnormality of the sensor is suspected, it can be considered that the EGR valve 56 is closed.

However, there is a risk that closing of the EGR valve may be hindered by the aforementioned "biting" at a minute level that is difficult to detect with the detection accuracy of the EGR valve opening degree sensor.

Therefore, instead of the processing in step S200 in the specific processing of the above described embodiment, the ECU 70 may execute processing that takes a fact that the opening degree sensor included in the EGR valve 56 indicates that the degree of opening is zero as establishment of the condition in step S200. Subsequently, if an abnormality in the EGR valve 56 is detected by the routine shown in FIG. 4, even though the degree of opening detected by the EGR valve opening degree sensor indicates that the EGR valve 56 is closed, the ECU 70 may execute determination processing that determines that a totally closed abnormality has occurred at the EGR valve 56. Thus, a slight opening of the EGR valve that is difficult to detect with the EGR valve opening degree sensor can be detected as a totally closed abnormality.

Modification Example 6

In this connection, although in the specific processing of the above described embodiment, an abnormality (totally closed abnormality) in which the EGR valve 56 does not close in accordance with a control command is detected, the present invention is not limited thereto. As mentioned above in the section describing the operations of the embodiment, the size of the intake pulse 132 and the size of the exhaust pulse 130 in the synthesized pulse 134 change in accordance with the operating state (degree of opening) of the EGR valve 122. Hence, a configuration may be adopted that, by comparing the size of an extracted pulse with a predetermined value or the like, determines whether an extracted pulse component matches a characteristic that should be exhibited when the EGR valve is operating normally. Thus, detection is not limited to detection of a totally closed abnormality, and detection (detection of a degree of opening abnormality) may also be performed with respect to whether the EGR valve 56 is open at a normal degree of opening in accordance with a control command.

Modification Example 7

Although according to the above described embodiment the ECU 70 executes FFT arithmetic processing, a configuration may also be adopted that uses a frequency filter (may be software or hardware) instead of executing FFT arithmetic processing. In this case, it is preferable to use a frequency filter function that can change a frequency that is a filtering target in accordance with the number of engine revolutions.

Modification Example 8

Although according to the above described embodiment a synthesized pulse is detected using the intake pressure sensor 32 that is installed at a center section of the intake manifold 30, the present invention is not limited to this form with respect to installation of the pressure sensor. A synthesized pulse can be propagated over a wide range inside the intake system, and can also be detected at a location other than a center section within the intake manifold 30 or, for example, at a location that is further upstream of the electronically controlled throttle 28. Thus, tests may be conducted to determine a position at which a synthesized pulse that arises in accordance with opening of the EGR valve 56 can be detected inside a passage to which pulses of intake air and exhaust gas can propagate of the internal combustion engine, and a pressure sensor may be installed at a desired position that is determined based on the results and utilized.

Modification Example 9

According to the above described embodiment, extraction and analysis (that is, comparison and determination regarding the size of a pulse component) is performed that takes an exhaust pulse component as an object among pulse components included in a synthesized pulse. However, the present invention is not limited thereto. If an intake pulse when the EGR valve 56 is closed and an intake pulse while the EGR valve 56 is open are compared, the sizes of the pulse components will be different from each other since the intake pulse while the EGR valve 56 is open propagates to the EGR pipe 52 side. Therefore, extraction and analysis of an intake pulse component among the pulse components included in a synthesized pulse may also be performed. Alternatively, a configuration may be adopted in which a synthesized pulse is split into an intake pulse component and an exhaust pulse component, and thereafter analysis is performed that takes both components as an object.

REFERENCE SIGNS LIST

10 engine main body
20,22,24,26 intake passage section
28 electronically controlled throttle
30 intake manifold
32 intake pressure sensor
40,42 exhaust manifold
44 exhaust pipe
46 catalyst
50 gas take-out portion
52 EGR pipe
54 EGR cooler
56 EGR valve
60 compressor
62 turbine
64 turbocharger
100 cylinder
102 piston
104 intake valve
106 exhaust valve
108 intake port
110 surge tank
112 intake passage
114 exhaust port
120 EGR pipe
122 EGR valve
130 exhaust pulse
132 intake pulse
134 synthesized pulse

The invention claimed is:
1. An abnormality detection device for an exhaust gas recirculation apparatus that is an abnormality detection device that detects an abnormality in an exhaust gas recirculation apparatus that comprises, in an internal combustion engine having a plurality of cylinders: an EGR passage that, among a first exhaust passage communicating with some cylinders of the plurality of cylinders and a second exhaust passage communicating with other cylinders of the plurality of cylinders, links the first exhaust passage and an intake passage of the internal combustion engine; and an EGR valve mounted in the EGR passage;
  the abnormality detection device comprising:
    an intake pressure sensor capable of detecting an intake pressure of the internal combustion engine and a synthesized pulse, an intake pulse of the intake passage and an exhaust pulse of the first exhaust passage being synthesized in the synthesized pulse;
    extraction means that, based on a difference between a period of the intake pulse and a period of the exhaust pulse, extracts at least one pulse component among a pulse component of a period in accordance with the intake pulse and a pulse component of a period in accordance with the exhaust pulse from an output value of the pressure sensor that detects the synthesized pulse; and detection means that detects an abnormality in the exhaust gas recirculation apparatus based on a size of the at least one pulse component that is extracted by the extraction means.

2. The abnormality detection device for an exhaust gas recirculation apparatus according to claim 1, wherein the detection means comprises:

calculation means that calculates an integrated value obtained by integrating absolute values of slopes of tangent lines to a pulse waveform with respect to the at least one pulse component that is extracted by the extraction means, as the size of the pulse component; and means that detects an abnormality in the exhaust gas recirculation apparatus based on a result obtained by comparing the integrated value with a predetermined value.

3. The abnormality detection device for an exhaust gas recirculation apparatus according to claim 1, wherein the detection means comprises:

amplitude acquisition means that acquires an amplitude of the at least one pulse component that is extracted by the extraction means, as the size of the pulse component; and amplitude comparison detection means that detects an abnormality in the exhaust gas recirculation apparatus based on a result obtained by comparing the amplitude that is acquired by the amplitude acquisition means with a predetermined value.

4. The abnormality detection device for an exhaust gas recirculation apparatus according to claim 1, wherein the detection means comprises:

closing abnormality detection means that, in a case where a control command is sent to the EGR valve to instruct the EGR valve to close, detects a totally closed abnormality that is an abnormality in which the EGR valve is not closed in accordance with the control command, based on a result obtained by comparing a size of the at least one pulse component that is extracted by the extraction means with a predetermined value.

5. The abnormality detection device for an exhaust gas recirculation apparatus according to claim 4, wherein:

the exhaust gas recirculation apparatus comprises an EGR valve opening degree sensor for detecting a degree of opening of the EGR valve; and the detection means comprises determination means that, in a case where the totally closed abnormality is detected by the closing abnormality detection means, determines that the totally closed abnormality is occurring at the EGR valve even when the degree of opening detected by the EGR valve opening degree sensor indicates that the EGR valve is closed.

6. The abnormality detection device for an exhaust gas recirculation apparatus according to claim 1, wherein:

the extraction means comprises an exhaust pulse extraction means that, based on a difference between a period of the intake pulse and a period of the exhaust pulse, extracts a pulse component that is in accordance with the exhaust pulse from the output value of the intake pressure sensor that detects the synthesized pulse.

7. The abnormality detection device for an exhaust gas recirculation apparatus according to claim 1, wherein:

the internal combustion engine comprises a supercharger, and control means that controls a supercharging pressure generated by the supercharger; and the abnormality detection device performs abnormality detection for the exhaust gas recirculation apparatus using the intake pressure sensor, the extraction means, and the detection means in a common manner for both a region in which an intake pressure is larger than an exhaust pressure and a region in which an intake pressure is equal to or smaller than an exhaust pressure with respect to the internal combustion engine.

8. The abnormality detection device for an exhaust gas recirculation apparatus according to claim 1, wherein:

the internal combustion engine comprises a supercharger and a waste gate valve; and the extraction means comprises means that controls the waste gate valve so as to reduce a degree of opening of the waste gate valve or close the waste gate valve when detecting, with the intake pressure sensor, the synthesized pulse that is an object on which extraction of the pulse component is performed.

9. The abnormality detection device for an exhaust gas recirculation apparatus according to claim 1, further comprising:

reduction means that reduces an intake volume of the internal combustion engine;

wherein the extraction means comprises means that controls the reduction means so as to reduce the intake volume when detecting, with the intake pressure sensor, the synthesized pulse that is an object on which extraction of the pulse component is performed.

10. An abnormality detection device for an exhaust gas recirculation apparatus that is an abnormality detection device that detects an abnormality in an exhaust gas recirculation apparatus that comprises, in an internal combustion engine having a plurality of cylinders: an EGR passage that, among a first exhaust passage communicating with some cylinders of the plurality of cylinders and a second exhaust passage communicating with other cylinders of the plurality of cylinders, links the first exhaust passage and an intake passage of the internal combustion engine; and an EGR valve mounted in the EGR passage;

the abnormality detection device comprising:

an intake pressure sensor to detect an intake pressure of the internal combustion engine and a synthesized pulse of an intake pulse of the intake passage and an exhaust pulse of the first exhaust passage reaches while the EGR valve is open; and an electronic control unit that is configured to, based on a difference between a period of the intake pulse and a period of the exhaust pulse, extract at least one pulse component among a pulse component of a period in accordance with the intake pulse and a pulse component of a period in accordance with the exhaust pulse from an output value of the intake pressure sensor that detects the synthesized pulse, and detect an abnormality in the exhaust gas recirculation apparatus based on a size of the at least one pulse component that is extracted by the electronic control unit.

* * * * *